July 4, 1967  W. J. ROTHER  3,329,370
TAKE-UP REEL
Filed Dec. 20, 1965  2 Sheets-Sheet 1
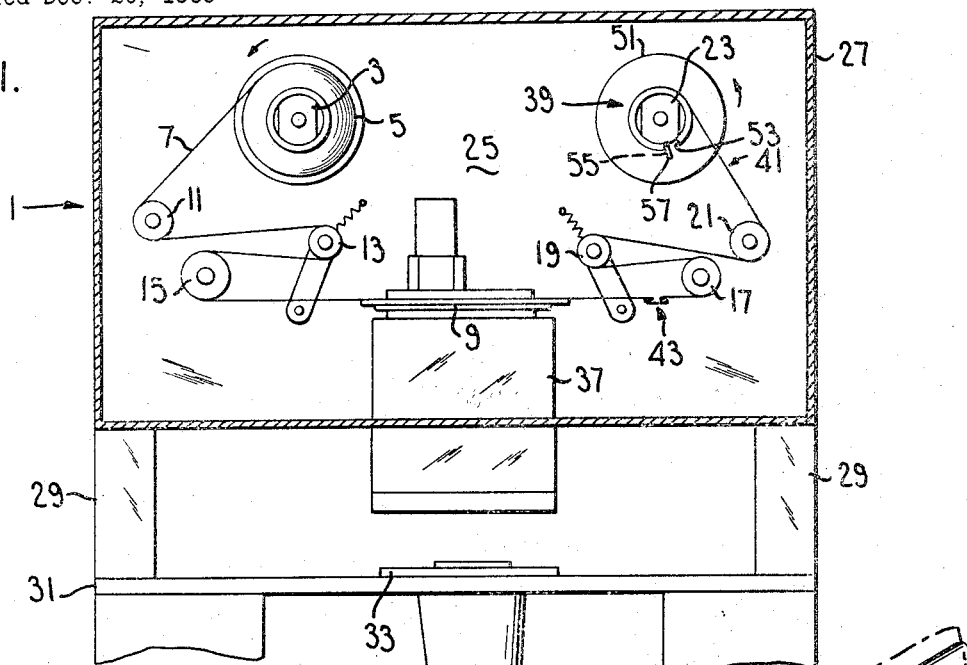
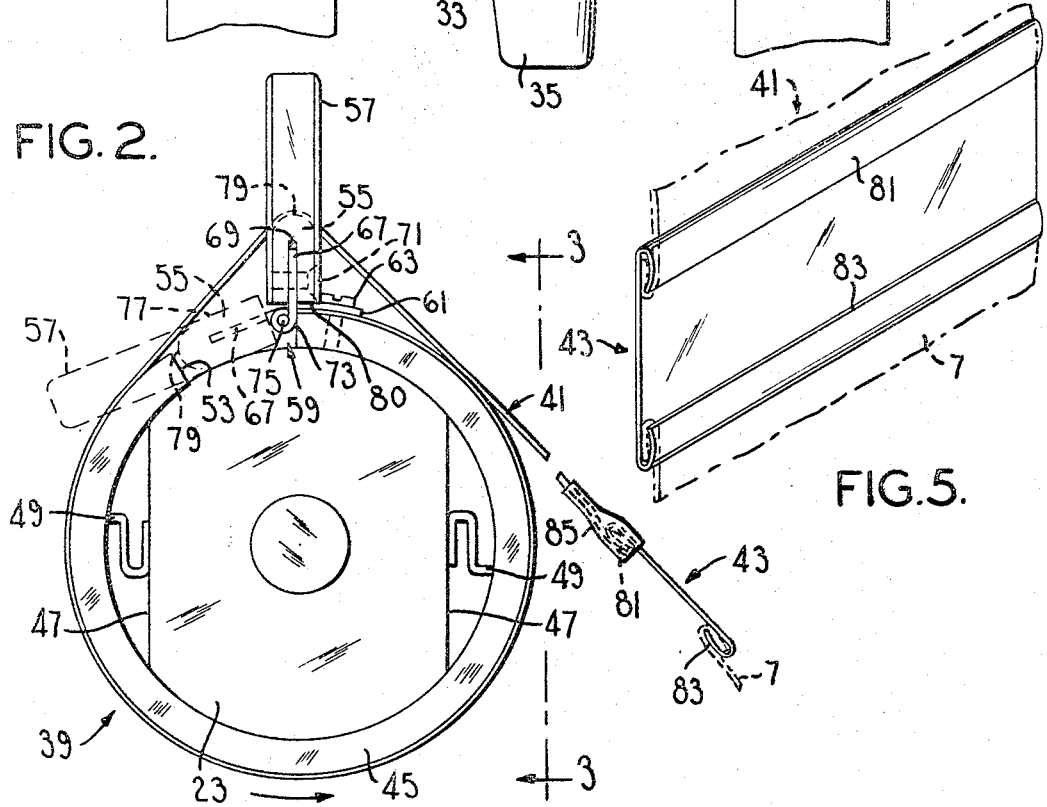
William Jack Rother,
Inventor.
Koenig, Senniger, Powers and Leavitt,
Attorneys.

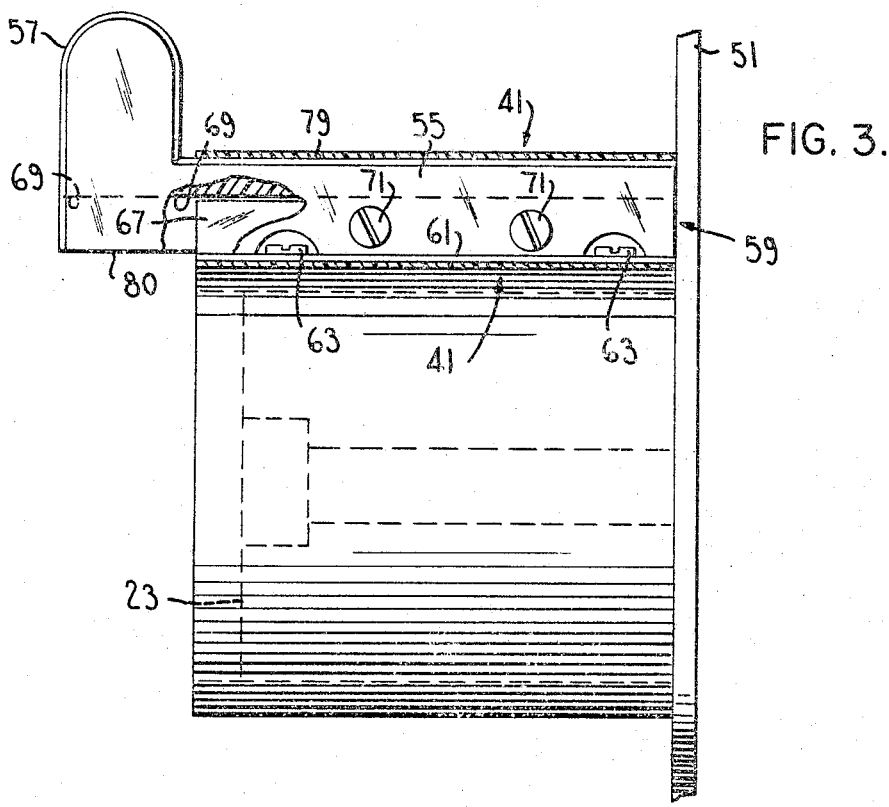
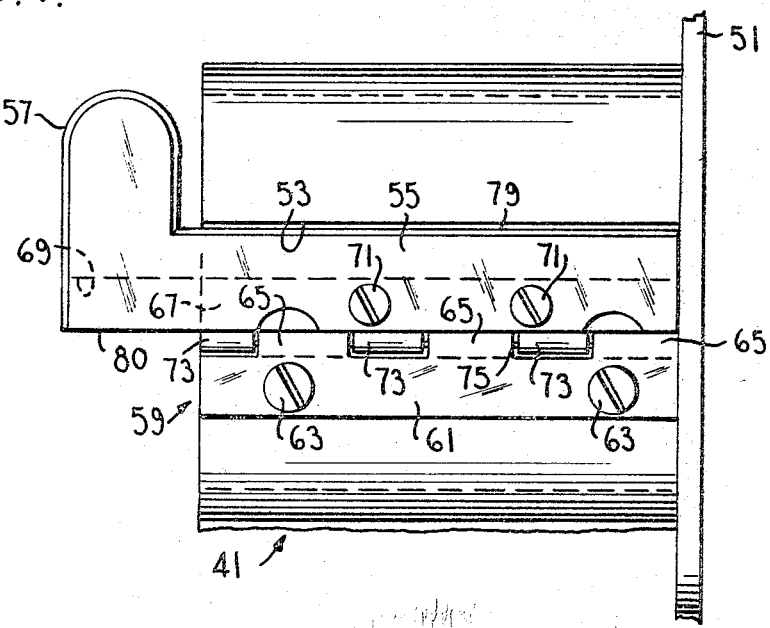

United States Patent Office 3,329,370
Patented July 4, 1967

3,329,370
TAKE-UP REEL
William Jack Rother, St. Louis, Mo., assignor to Technicolor Corporation of America, Hollywood, Calif., a corporation of Maine
Filed Dec. 20, 1965, Ser. No. 514,843
10 Claims. (Cl. 242—72)

ABSTRACT OF THE DISCLOSURE

A take-up reel for a roll paper printer having a leader strip attached to the reel and a collapsible bar. The bar is mounted for swinging movement on the reel between a radially extending position for winding the leader and paper on the reel and an axially extending position for removing the paper from the reel and leader.

---

This invention relates to take-up reels, and more particularly to a take-up reel for winding up photographic print paper in a photographic roll paper printer.

In a conventional photographic roll paper printer, a web of photographic print paper is unwound from a supply roll, passes over a mask having a window opening for exposing successive frames of the paper to light projected through the frames of photographic negatives, and the exposed paper is wound up on a core on a take-up spindle, the core with a length of exposed paper web wound in a roll thereon being removed and transferred to other processing apparatus. Heretofore, each time the exposed paper is removed, the procedure has been to rethread the paper from the supply spindle through the printer, and attach the leading end of the paper to a fresh core on the take-up spindle for continuing the printing operations. This has the serious disadvantage that, on each such rethreading operation, the portion of the paper extending from the mask to the core on the take-up spindle is wasted and, in volume printing, this waste can become extensive. It is particularly serious in color printing, where the paper is relatively expensive, and the waste of even a few feet of paper each time the supply is replenished can mount up to considerable dollar loss.

Accordingly, among the several objects of this invention may be noted the provision of an improved take-up reel, particularly for use in a printer such as above described, having a leader strip adapted to eliminate waste of paper heretofore attendant on threading the paper through the printer; the provision of a reel for this purpose which is collapsible so that the wound-up roll of exposed paper may be readily removed therefrom, eliminating the necessity for the use of fresh cores on the take-up spindle, and the leader strip readily uncoiled for being threaded back through the printer to the mask; the provision of a collapsible reel such as described which is adapted automatically to expand for winding up the leader strip and the paper simply as a result of rotating it; and the provision of a reel such as described which is easy to use and economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in front elevation of a typical roll paper printer equipped with a take-up reel of this invention;

FIG. 2 is a front end view of the take-up spindle of the printer with the reel of this invention thereon, on a larger scale than FIG. 1, showing in solid lines an expansion bar of the reel in its extended winding position and illustrating in dotted lines the bar in its collapsed position;

FIG. 3 is a view taken on line 3—3 of FIG. 2;

FIG. 4 is a plan view of FIG. 2, showing the bar in its collapsed position; and

FIG. 5 is a perspective of a clip used at the outer end of the leader strip of the reel.

Corresponding reference characters indicate corresponding parts throughout the several views of the drawings.

Referring first to FIG. 1 of the drawings, there is indicated at 1 a typical photographic roll paper printer, essentially comprising a supply spindle 3 which holds a roll 5 of photographic paper 7 to be fed over a mask 9 for photoprinting on the paper. The web of paper passes from roll 5 first around an idler roller 11, thence around a tension roller 13 and a drive roller 15, and thence horizontally over the mask. From the mask, it is adapted to pass around a tracking roller 17, a take-up tension roller 19, an idler roller 21 and thence to a take-up spindle 23.

The above-mentioned components are mounted on a panel 25 in a cabinet structure 27 supported as indicated at 29 above a table 31. On the table is a mask plate assembly 33 through which a negative from which prints are to be made is manually fed one frame at a time. Below the table is a lamp housing 35, the light from the lamp in the housing being projected upward through a window opening in the negative mask plate assembly, thence through a so-called tower 37, and through a window opening in mask 9 for exposing the lower face of the paper traversing the mask 9. After each exposure, the paper is indexed forward one frame, and the operator of the printer manually feeds the negative strip forward one frame to make the next exposure.

The printer, as above described, is conventional and well known in the art, and will be recognized as, for example, a Kodak 5S Roll Paper Color Printer sold by Eastman Kodak Company of Rochester, N.Y. Ordinarily, a hollow cylindric core is slipped on the take-up spindle 23 and the leading end of the strip of paper 7 is attached to the core, as by adhesive tape, for winding up the paper on the core. Each time the paper is threaded through the printer, and its end attached to a fresh core on the take-up spindle, there is resultant waste of the length of paper from the mask 9 to the take-up spindle, which may involve about four feet of paper. Wasting this amount of paper each time the paper is rethreaded can build up to substantial waste dollarwise, particularly in the case of color printing paper (which is relatively expensive). This invention primarily involves a special take-up reel 39 equipped with a leader strip 41 of a length adapted to reach back from the reel to the mask and having a clip 43 at its end for attachment of the end of the strip of paper 7 to eliminate waste of paper on rethreading.

As appears in FIGS. 2-4, the take-up reel 39 comprises a hollow cylindric core 45 having an internal diameter such as to fit snugly on the take-up spindle 23. The latter conventionally has flats 47 carrying spring grippers such as indicated at 49 for gripping the core so that the core rotates with the spindle 23, which is positively intermittently driven in counterclockwise direction as viewed in FIGS. 1 and 2 to take up the leader strip and the paper 7. The spindle 23 also has a back flange 51. Core 45, which may be made of suitable plastic material, is in effect split to provide a gap or recess 53 extending throughout its length. A bar 55 is pivoted on the core for swinging movement between a collapsed position lying within the gap (as shown in dotted lines in FIG. 2 and in solid lines in FIG. 4) and a winding position extending generally radially outward from the core (as shown in solid lines in FIGS. 2 and 3). The bar has a width somewhat less than the width of the gap and is somewhat longer than the core so as to project at one end (its outer end) beyond the respective end of the core. At its outer end the bar has a right-angle ear 57 constituting a handle arranged to extend radially outward when the bar is in its extended position.

The bar 55 is pivoted on the core by means of a hinge generally designated 59, one leaf 61 of which is secured by screws 63 on the outside of the core adjacent the gap 53 with its hinge eyes 65 in the gap adjacent one side of the gap. The other leaf 67 of the hinge is inserted in a slot 69 in one of the edges of the bar and the bar is attached to this leaf 67 by screws 71. The eyes 73 of leaf 67 fit between the eyes of leaf 61 and a hinge pin 75 extends through the eyes. The arrangement is such that bar 55 may swing on the axis of pin 75 (which is located in the gap at one side thereof) into and out of the gap between its collapsed position, wherein it lies generally within the gap with face 77 of the bar generally flush with the periphery of the core, and its extended winding position, wherein the edge 79 of the bar opposite its hinged edge is spaced substantially outward from the periphery of the core. This edge 79 of the bar is preferably rounded. The longitudinal edge 80 of the bar adjacent the hinge axis is engageable with the outside of hinge leaf 61 on the core to limit the outward swing of the bar to determine the extended winding position of the bar wherein the bar extends generally radially outward from the core.

The leader strip 41 consists preferably of a strip of tough flexible sheet plastic material. As shown in FIG. 2, the inner end of the leader strip is secured to the core 45 by being clamped under the hinge leaf 61, with screws 63 extending through holes in the leader strip. The length of the leader strip corresponds to the distance along the path of travel of the paper from the exit end of the mask to the reel 39 on the take-up spindle. The clip 43 at the outer end of the leader strip is of special construction, being formed from a rectangular blank of sheet metal having its two opposite long marginal portions bent over on one face of the blank to form hook 81 as shown) and bent around the later, and may of the leader strip is inserted in one of these hooks (the hook 81 is shown) and bent around the latter, and may be securely attached to the clip by adhesive tape as indicated at 85 in FIG. 2. The other hook 83 is adapted for insertion of the end of paper strip 7 and bending back of the strip around the hook as indicated in FIGS. 2 and 5 to attach the end of the paper web to the leader strip, while permitting it readily to be detached therefrom. The width of the hook and the width of the leader strip correspond to the width of the paper, and the hooks are relatively flat, with just enough space between the hooks and the body of the clip in relation to the thickness of the paper and the thickness of the leader strip for insertion of the paper and the leader strip in the hooks.

In the use of the reel 39, the leader strip 41 is uncoiled from the core 45 and threaded back through the printer around rollers 21, 19 and 17 to bring clip 43 adjacent the exit end of the mask 9. The paper web 7 is unwound from the roll 5 on the supply spindle 7 and threaded through the printer (i.e., around rollers 11, 13 and 15 and through the mask 9) to the point where the end of the web is just past the exit end of the mask 9. The end of the web is inserted in hook 83 of the clip 43 for attachment to the leader strip. Operation of the printer then proceeds in normal manner, the take-up spindle 23 rotating intermittently and core 45 rotating therewith first to wind up the leader strip on the core followed by winding of the paper. During the initial revolution of the core (which rotates counterclockwise as viewed in FIG. 1), the bar 55, rotating around with the core, will reach a position at the bottom of the reel, and will automatically swing down on hinge pin 75 to its extended position, this action occurring before the leader strip wraps up around the bar. Thus, the bar is automatically extended as an inherent result of rotating the reel at the start of a winding operation. The leader strip winds up around the extended bar, followed by winding up of the paper. The tension of the leader strip on the bar as the leader strip winds around edge 79 of the bar holds the bar in its extended winding position.

When a length of paper has been wound up into a roll on the reel 39, the bar 55 is manually swung to its collapsed position (shown in dotted lines in FIG. 2), this being facilitated by the provision of handle 57 on the bar. This permits endwise removal of the wound-up roll of paper off the forward end of the core 45. When the roll of paper is removed, the leader strip uncoils from the core, and the end of the paper web may be readily detached from the hook 83 of clip 43, all without detachment of the leader strip from the core. The leader strip may then be threaded back through the printer, the leading end of the paper attached to the clip, and the operation repeated.

It will be observed that as a result of using the leader strip, waste of paper is substantially eliminated. The reel 39 constitutes a permanent fixture on the take-up spindle 23, and the necessity for use of a fresh core on the take-up spindle on each rethreading operation is eliminated. With the reel collapsible, the wound-up roll of paper is readily removable endwise from the reel, and the leader strip uncoils from the reel as a result of removing the roll so that it is in effect automatically readied for being threaded back through the printer. The bar 55 automatically swings to its extended winding position at the start of each new winding operation, eliminating any necessity for attention on the part of the operator of the printer to the position of the bar, and assuring that winding proceeds with the bar in winding position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A reel comprising a core, a leader strip attached at one end thereof to the core, said leader strip having means at its other end for gripping the end of a web for winding of the leader strip and then the web on the core, a bar extending lengthwise of the core, and means mounting the bar on the core for movement between a winding position extended outward from the core and a collapsed position adjacent the periphery of the core, movement of the bar to its collapsed position permitting endwise removal of the wound-up roll of web from the core, uncoiling of the leader strip, and detachment of the web from the gripping means, without detachment of the leader strip from the core.

2. A reel as set forth in claim 1 wherein the mounting means comprises means for pivoting the bar for swinging movement about an axis extending lengthwise of the core, the bar being adapted freely to swing down on said axis to its winding position upon rotation of the core after removal of the wound-up web and uncoiling of the leader strip from around the bar.

3. A reel as set forth in claim 2 wherein the bar has a handle at one end thereof spaced outward from the respective end of the core for swinging the bar from its winding to its collapsed position.

4. A reel as set forth in claim 2 wherein the core has a gap therein, the pivotal axis of the bar being located along one longitudinal edge of the bar adjacent one side of said gap, and said bar being adapted to swing into and out of the gap.

5. A reel as set forth in claim 4 wherein said one longitudinal edge of the bar is engageable with the core adjacent the gap to limit the outward swing of the bar to determine the winding position of the bar with the bar extending generally radially outward from the core in its said winding position, the tension of the leader strip on the bar as the leader strip winds around the other and outer edge of the bar being adapted to hold the bar in its said winding position.

6. A reel as set forth in claim 5 wherein the core is of split hollow cylindrical form, the split defining the gap.

7. A reel as set forth in claim 1 wherein said gripping means comprises a clip having a hook adapted for insertion of the end of the web and bending back of the web therearound.

8. A reel as set forth in claim 7 wherein the clip is formed of a generally rectangular blank of sheet metal having a marginal portion bent over on one face of the blank to form the hook.

9. In a photographic roll paper printer having a mask, means for holding a supply roll of paper to be fed over the mask, means for winding up the paper fed over the mask, the paper traveling through a path of substantial length from the mask to the wind-up means, said wind-up means comprising a reel, a leader strip attached at one end thereof to the reel, said leader strip having a length corresponding to the distance along said path from the mask to the reel, and having means at its other end for gripping the end of the paper for winding of the leader strip and then the paper on the reel, a bar extending lengthwise of the reel, and means mounting the bar on the reel for movement between a winding position extended outward from the reel and a collapsed position adjacent the periphery of the reel, movement of the bar to collapsed position permitting endwise removal of the wound-up roll of paper from the reel, uncoiling of the leader strip from the reel, and detachment of the paper from the gripping means, without detachment of the leader strip from the reel.

10. In a photographic roll paper printer as set forth in claim 9, the reel having a gap extending lengthwise thereof, the mounting means for the bar comprising means for pivoting the bar for swinging movement about an axis extending lengthwise of the gap adjacent one side thereof so that the bar may swing into and out of the gap.

References Cited
UNITED STATES PATENTS

| | | | |
|---|---|---|---|
| 1,438,212 | 12/1922 | Baluta | 242—74 X |
| 1,956,429 | 4/1934 | Toothaker | 242—72 X |

FRANK J. COHEN, *Primary Examiner.*

N. L. MINTZ, *Assistant Examiner.*